US009157215B2

(12) United States Patent
Stanley et al.

(10) Patent No.: US 9,157,215 B2
(45) Date of Patent: Oct. 13, 2015

(54) VEHICLE PAYLOAD WEIGHT DISPLAY METHOD AND SYSTEM

(71) Applicant: Caterpillar Inc., Peoria, IL (US)

(72) Inventors: Robert W. Stanley, Chillicothe, IL (US); Jeffrey E. Buettner, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 358 days.

(21) Appl. No.: 13/717,301

(22) Filed: Dec. 17, 2012

(65) Prior Publication Data

US 2014/0167971 A1    Jun. 19, 2014

(51) Int. Cl.
*G08B 21/00* (2006.01)
*E02F 9/26* (2006.01)
*G01G 19/08* (2006.01)
*E02F 9/22* (2006.01)

(52) U.S. Cl.
CPC ............... *E02F 9/264* (2013.01); *E02F 9/2296* (2013.01); *G01G 19/083* (2013.01)

(58) Field of Classification Search
None
See application file for complete search history.

(56) References Cited

U.S. PATENT DOCUMENTS

| 4,839,835 | A | * | 6/1989 | Hagenbuch | 702/174 |
| 4,919,222 | A | * | 4/1990 | Kyrtsos et al. | 177/139 |
| 4,921,578 | A | * | 5/1990 | Shiraishi et al. | 177/25.19 |
| 5,067,572 | A | * | 11/1991 | Kyrtsos et al. | 177/139 |
| 5,070,953 | A | * | 12/1991 | Kyrtsos et al. | 177/25.14 |
| 5,082,071 | A | * | 1/1992 | Kyrtsos et al. | 177/25.14 |
| 5,182,712 | A | * | 1/1993 | Kyrtsos et al. | 701/50 |
| 5,780,783 | A | * | 7/1998 | Heider et al. | 177/137 |
| 6,518,519 | B1 | * | 2/2003 | Crane et al. | 177/136 |
| 6,601,013 | B2 | * | 7/2003 | Lueschow et al. | 702/175 |
| 6,858,809 | B2 | * | 2/2005 | Bender | 177/136 |
| 7,627,410 | B2 | | 12/2009 | Berry et al. | |
| 7,881,903 | B2 | * | 2/2011 | Chen | 702/174 |
| 2013/0211214 | A1 | * | 8/2013 | Olsen | 600/316 |

* cited by examiner

*Primary Examiner* — Travis Hunnings
(74) *Attorney, Agent, or Firm* — BakerHostetler

(57) ABSTRACT

A computer-based method for displaying an implement payload weight to an operator of a vehicle is provided. The method includes calculating an implement payload weight at a lift position, displaying, at a first location on a monitor, the calculated implement payload weight, determining an accuracy of the calculated implement payload weight, and displaying, at a second location on the monitor proximate to the first location, an accuracy indicator based on the accuracy of the calculated implement payload weight.

20 Claims, 5 Drawing Sheets

VEHICLE PAYLOAD WEIGHT DISPLAY METHOD AND SYSTEM

TECHNICAL FIELD

The present disclosure relates to vehicles. More particularly, the present disclosure relates to a vehicle payload weight display method and apparatus.

BACKGROUND

Off-highway vehicles, such as, for example, wheel loaders, wheel excavators, track loaders, track excavators, backhoe loaders, forestry machines, etc., are commonly used in material moving applications such as construction and demolition, mining, quarrying and stockpiling, forestry, waste processing, etc. To effectively accomplish tasks associated with these applications, the vehicles are typically outfitted with hydraulically-powered work implements such as buckets, forks, grapples, etc. A prime mover, for example a diesel, gasoline, or gaseous fuel-powered engine, may drive one or more hydraulic pumps that provide hydraulic power to the work implement. Hydraulically-powered work implements are typically controlled based on an actuation position of an operator interface device, such as a joystick, a pedal, etc.

Knowledge of the implement payload weight during operation of the vehicle is important for many reasons, including, for example, safety, work efficiency, etc. With respect to work efficiency, U.S. Pat. No. 7,627,410 describes a method of loading a truck with material using a loader that includes a step of determining a target load for a final pass.

Known systems display implement payload weights to the operator of a vehicle only when the implement is moving within a limited range of motion, also known as the weigh range. Unfortunately, the implement payload weight is not displayed to the operator when the implement is positioned above (tip off) or below (low lift) the weigh range. It is desirable to display the implement payload weight to the operator over the entire range of motion of the implement, and to provide an indication of the accuracy of the implement payload weight calculation.

SUMMARY

One aspect of the present disclosure provides a computer-based method for displaying an implement payload weight to an operator of a vehicle, including calculating, by a processor, an implement payload weight at a lift position, displaying, at a first location on a monitor, the calculated implement payload weight, determining, by the processor, an accuracy of the calculated implement payload weight, and displaying, at a second location on the monitor proximate to the first location, an accuracy indicator based on the accuracy of the calculated implement payload weight.

Another aspect of the present disclosure provides a system for displaying an implement payload weight to an operator of a vehicle, including a monitor and a controller, coupled to the monitor, including a processor adapted to calculate an implement payload weight at a lift position, cause the calculated implement payload weight to be displayed on the monitor at a first location, determine an accuracy of the calculated implement payload weight, and cause an accuracy indicator to be displayed on the monitor, at a second location proximate to the first location, based on the accuracy of the calculated implement payload weight.

Yet another aspect of the present disclosure provides a system for displaying an implement payload weight to an operator of a vehicle, including means for calculating an implement payload weight at a lift position, means for determining an accuracy of the calculated implement payload weight, and means for displaying the calculated implement payload weight and an accuracy indicator proximate thereto, the accuracy indicator being based on the accuracy of the calculated implement payload weight.

DETAILED DESCRIPTION

Figure 1:
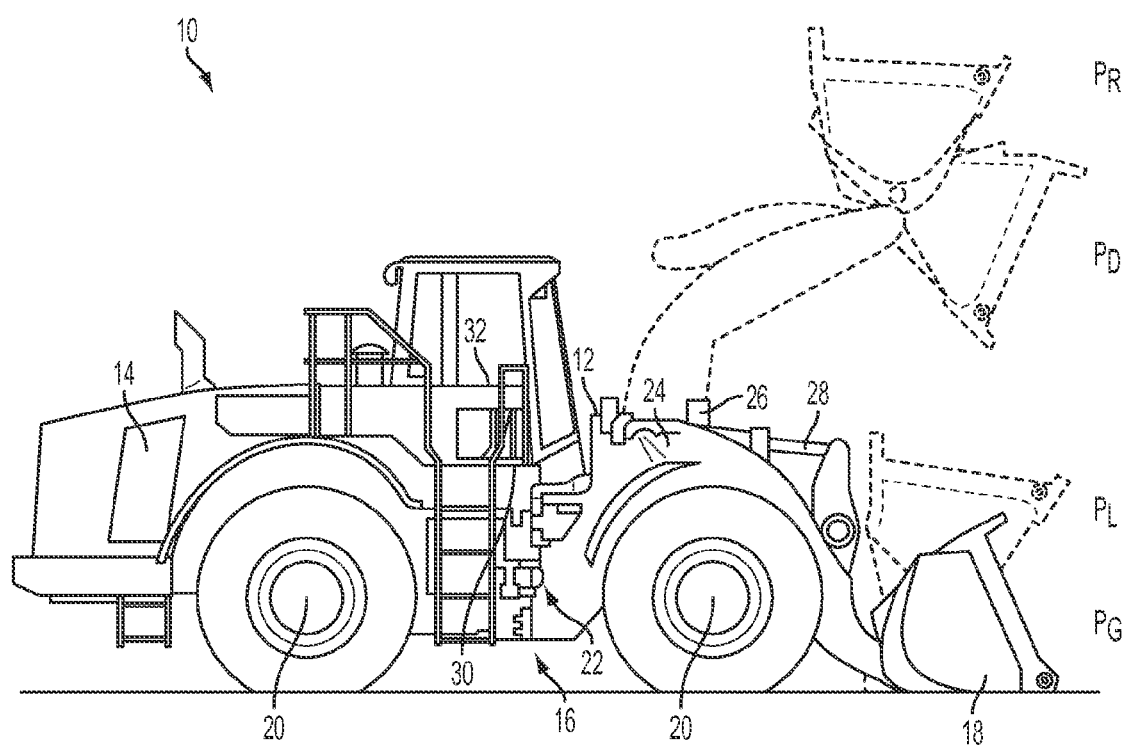
FIG. 1 presents an illustration of a vehicle in accordance with an embodiment of the present disclosure.

FIG. 1 illustrates an exemplary vehicle 10. Vehicle 10 may be a mobile vehicle that performs some type of operation associated with an industry such as mining, construction, farming, or any other industry known in the art. For example, vehicle 10 may be a material moving vehicle such as a wheel loader (depicted), excavator, backhoe, etc. Vehicle 10 may include a frame 12, a power source 14 supported by frame 12, a steering component 16, and an implement 18. Steering component 16 and implement 18 may be driven by power source 14 to steer vehicle 10 and to move relative to frame 12, respectively.

Frame 12 may include any structural member or assembly of members that supports movement of vehicle 10. For example, frame 12 may embody a stationary base frame connecting power source 14 to one or more traction devices 20 (e.g., wheels) and/or to implement 18. Alternatively, frame 12 may embody a movable frame member of a linkage system.

Power source 14 may be an engine, for example, a diesel engine, a gasoline engine, a gaseous fuel-powered engine such as a natural gas engine, or any other engine apparent to one skilled in the art. Power source 14 may also embody another source of power such as a fuel cell, a power storage device, or any other source of power. Power source 14 may be supported by frame 12 and configured to produce a mechanical and/or electrical power output used to drive operation of steering component 16 and implement 18.

Steering component 16, in one embodiment, may include a centrally-located articulation joint or hitch. To affect steering of vehicle 10, one or more hydraulic actuators 22 located on one side of vehicle 10 may extend while one or more similar hydraulic actuators (not visible) located on an opposite side of vehicle 10 simultaneously retracts. The paired extension and retraction of the opposing hydraulic actuators 22 may cause a forward-end of vehicle 10 to pivot about steering component 16 relative to a back-end of vehicle 10. It is contemplated that steering component 16 may alternatively or additionally include a rack and pinion mechanism, independent gear drives or motors associated with individual traction devices 20, or other steering components known in the art, if desired.

Implement 18 may embody a specialized device used in the performance of a particular task, such as, for example, a bucket, a shovel, etc. Implement 18 may be connected to frame 12 via a linkage system 24 and movable relative to frame 12 by way of one or more hydraulic actuators. Implement 18 is shown as being lifted by one or more hydraulic actuators 26 and tilted by hydraulic actuator 28. It is also contemplated that implement 18 may alternatively or additionally be configured to pivot, rotate, slide, swing, or move in any other way relative to frame 12, if desired. Several lift positions are depicted in FIG. 1, including a ground position $P_G$, a low-level carry position $P_L$, a fully-raised carry position $P_R$, and a fully-raised dump position $P_D$.

Steering and implement control of vehicle 10 may be provided by way of an operator station 30. Operator station 30 may be supported by frame 12 and include one or more operator interface devices 32, for example, a steering wheel, single or multi-axis joysticks, switches, knobs, or other known devices that are located proximal to an operator seat. Operator interface devices 32 may be proportional-type controllers configured to generate control signals indicative of a desired position, force, velocity, and/or acceleration of hydraulic actuators 22, 26 and 28.

Figure 2:
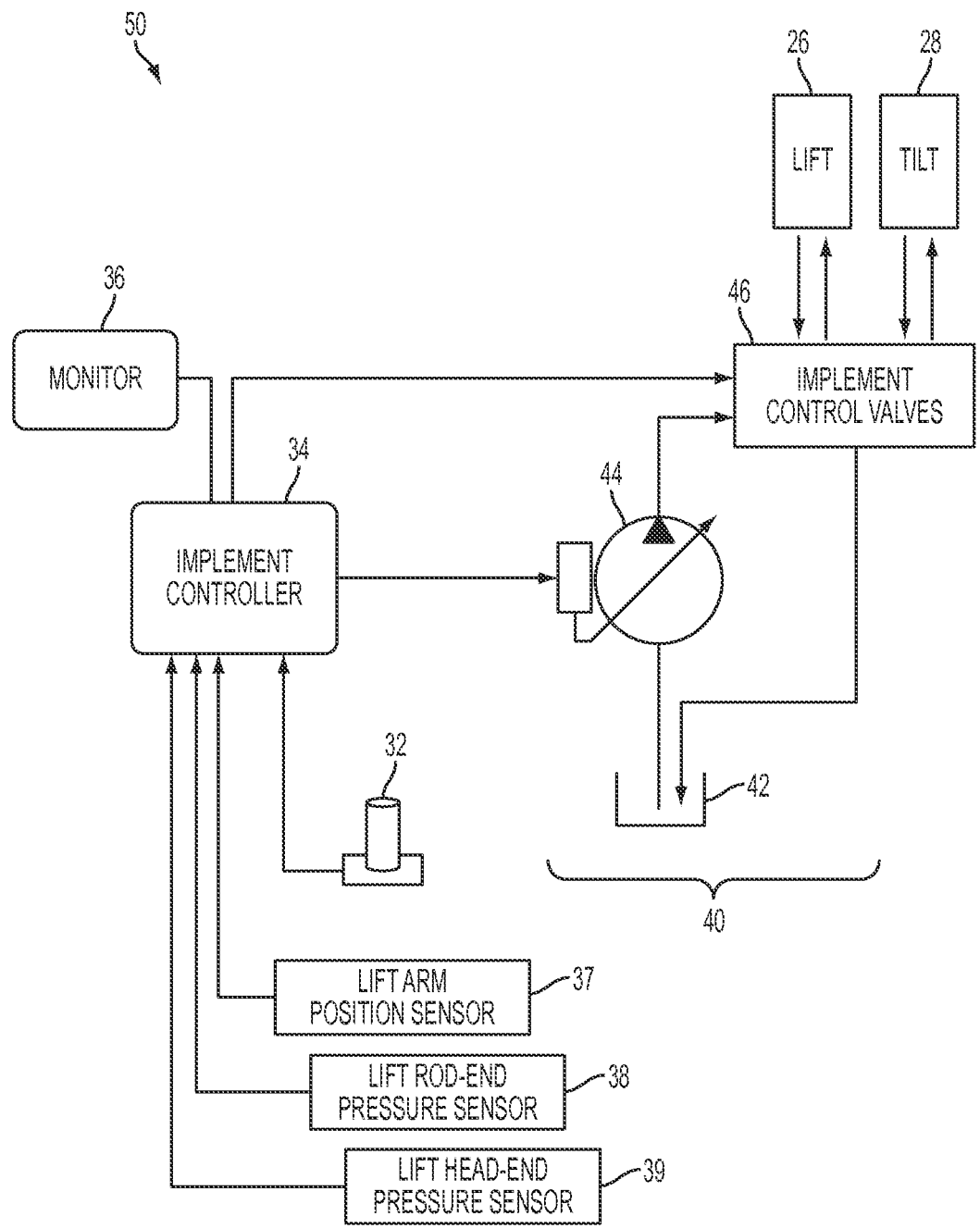
FIG. 2 illustrates a schematic of an implement control system for a vehicle in accordance with an embodiment of the present disclosure.

FIG. 2 illustrates a schematic of an implement control system 50 for a vehicle in accordance with an embodiment of the present disclosure.

Operator interface device 32 is coupled to an implement controller 34, such as, for example, an electronic control module (ECM), electronic control unit (ECU), etc., that includes at least one processor, volatile and non-volatile memory, input and output ports, network and communication ports, etc. Generally, controller 34 may be coupled to one or more data networks on board vehicle 10, such as, for example, a J1939 network, a proprietary differential data network, etc. Controller 34 is coupled to a monitor 36, such as a touch screen, and may be coupled to one or more additional, on board controllers, such as, for example, a Cab ECM, an Information ECM, etc., over one or more on board data networks, direct connections, etc.

Various sensors are also coupled to controller 34, including one or more lift arm position sensors 37, a lift cylinder rod-end pressure sensor 38, a lift cylinder head-end pressure sensor 39, etc. Lift arm position sensor 37 senses the lift position of a lift arm within linkage system 24 by sensing a rotation of the lift arm, using, for example, a rotary sensor or encoder. Other sensors may also be used to determine the lift position of the lift arm, such as, for example, an optical sensor, etc. Lift cylinder 26 is instrumented with at least two pressure sensors, e.g., lift cylinder rod-end pressure sensor 38 and lift cylinder head-end pressure cylinder 39.

Implement hydraulic circuit 40 includes a solenoid-controlled variable-displacement hydraulic pump 44, powered directly or indirectly by the engine. Pump 44 draws hydraulic fluid from reservoir 42, and provides pressurized hydraulic fluid to implement control valves 46, which are coupled to one or more lift cylinders 26 and tilt cylinder 28. Controller 34 is coupled to the solenoid of pump 44 to control the output of the pump 44, as well as to implement control valves 46 to control the operation of lift cylinder 26 and tilt cylinder 28.

INDUSTRIAL APPLICABILITY

Figure 3:
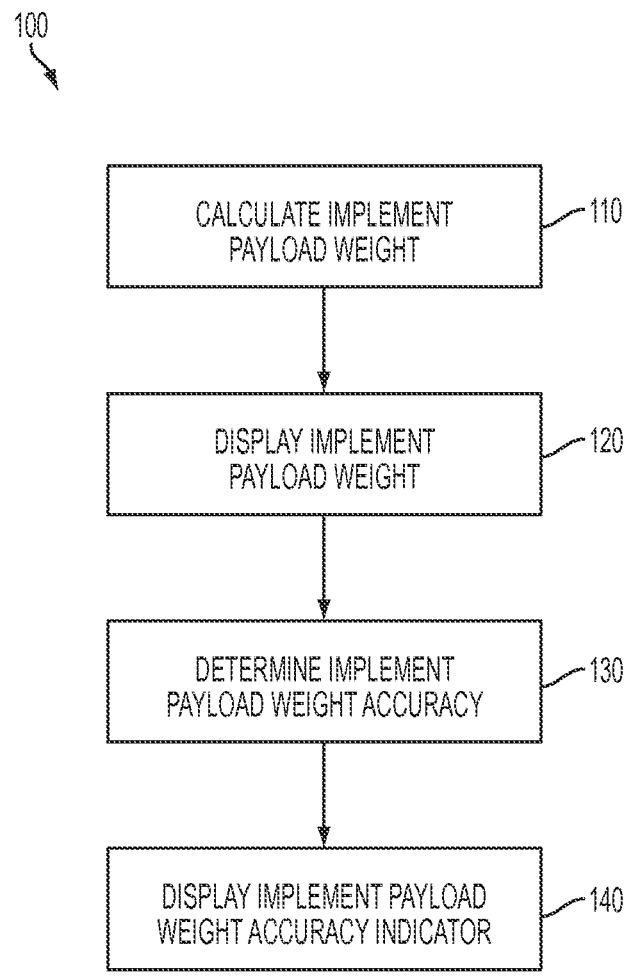
FIG. 3 presents a method for displaying an implement payload weight to an operator of a vehicle in accordance with an embodiment of the present disclosure.

FIG. 3 presents a method 100 for displaying an implement payload weight to an operator of a vehicle in accordance with an embodiment of the present disclosure.

Controller 34 calculates (110) the implement payload weight at a lift position.

Lift arm position sensor 37 measures the position of a lift arm within linkage system 24, and provides these data to controller 34. In one embodiment, lift arm position sensor is a rotary sensor, and angular displacement data are provided to controller 34. These data are normalized to a percentage of the total range of motion of the implement 18, so that 0% lift position represents the lowest position of implement 18, and 100% represents a fully-racked position of implement 18. As noted above, other sensors may be used to measure the lift position of the lift arm, and the data normalized.

Lift rod-end pressure sensor 38 measures the pressure within the rod-end of the lift cylinder 26 at the lift position, and provides these data to controller 34. Similarly, lift head-end pressure sensor 39 measures the pressure within the head end of the lift cylinder 26 at the lift position, and provides these data to controller 34. Controller 34 then determines the difference in pressure between the lift rod-end pressure sensor 38 and the lift head-end pressure sensor for this lift position. Advantageously, controller 34 may factor out various detrimental effects, such as noise, hydraulic fluid temperature, linkage and pin friction, etc.

Controller 34 determines a calibration payload pressure difference at the lift position based on data associated with a calibration payload weight. In one embodiment, a calibration weight payload map or table, stored in the non-volatile memory of controller 34, correlates lift position to pressure difference in the rod-end and head-end lift cylinders for a particular calibration payload weight. The calibration weight payload map may be preloaded at the factory, or the calibration weight payload map may be created and stored by controller 34 using a calibration routine that acquires measurements from the pressure sensors in the rod-end and head-end lift cylinders at various lift positions for a particular calibration payload weight. A quadratic curve may be fit to the data. The calibration payload weight is typically close to the maximum (rated) payload weight of the implement control system, such as, for example, 95% of a bucket payload weight.

Similarly, controller 34 determines a zero payload pressure difference at the lift position based on data associated with a zero payload weight (i.e., an empty implement or bucket). A zero weight payload map or table, stored in the non-volatile memory of controller 34, correlates lift position to pressure difference in the rod-end and head-end lift cylinders for zero payload weight. The zero weight payload map may be preloaded at the factory, or the zero weight payload map may be created and stored by controller 34 using a calibration routine that acquires measurements from the pressure sensors in the rod-end and head-end lift cylinders at various lift positions for zero payload weight. A quadratic curve may be fit to the data.

The lift positions within the calibration weight payload map and the zero weight payload map typically represent a limited range of motion of the implement, i.e., a calibrated weigh range. For example, the lift positions within the maps may range from 10% to 90% of the maximum, or fully-racked, lift position. Consequently, controller 34 estimates the calibration and zero payload pressure differences for lift positions that fall on either extreme of the weigh range. In one embodiment, controller 34 uses calibration and zero payload weight map data for the lowest lift position for low lift conditions (i.e., lift positions below the weigh range), and uses calibration and zero payload weight map data for the highest lift position for top off conditions (i.e., lift positions above the weight range). In another embodiment, controller 34 calculates calibration and zero payload pressure differences using respective equations fit to the calibration and zero payload weight map data.

Controller 34 then determines the implement payload weight ($W_P$) based on the measured pressure difference ($P_M$), the calibration payload pressure difference ($P_C$), the zero payload pressure difference ($P_Z$) and the calibration payload weight ($W_C$). In one embodiment, a simple linear interpolation is used to calculate $W_P$:

$$W_P = [(P_M - P_Z)/(P_C - P_Z)] * W_C$$

The implement payload weight may be passed through a low pass filter, such as, for example, a Butterworth filter, with a particular sampling period (ms) and cutoff frequency (rad/sec) based on the vehicle configuration.

In another embodiment, controller 34 calculates the implement payload weight by measuring a deflection of the lift arm, or other similar component, within linkage system 24 using an optical sensor. In a further embodiment, controller 34 calculates the implement payload weight by measuring a strain of the lift arm, or other similar component, within linkage system 24 using a strain gauge.

Figure 4:
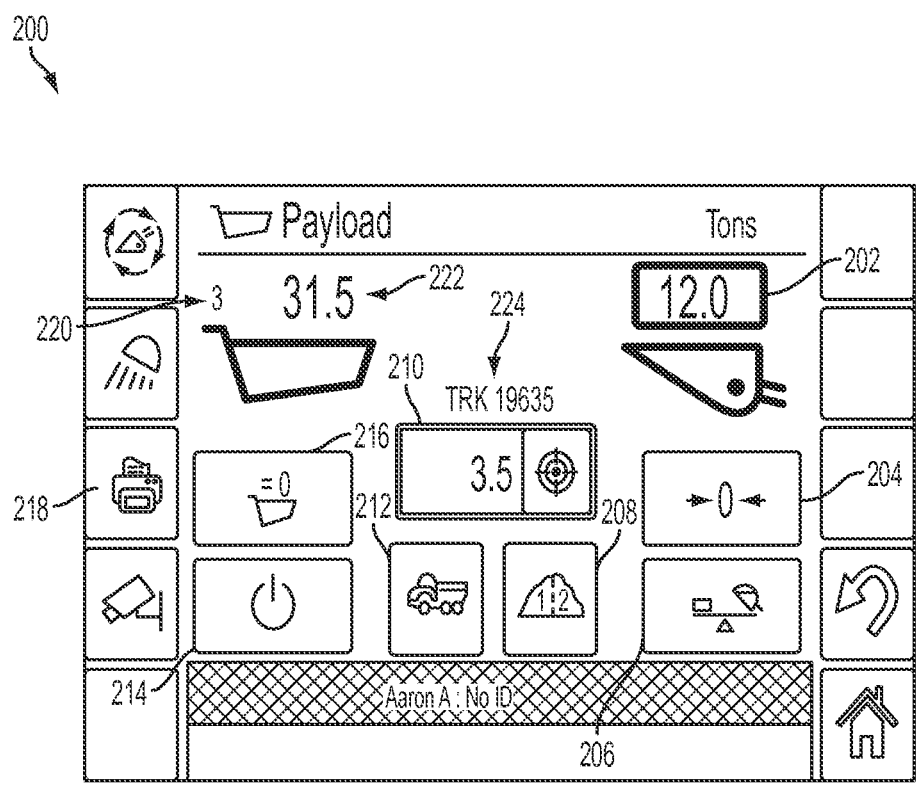
FIG. 4 depicts a display screen of an implement control system for a vehicle in accordance with an embodiment of the present disclosure
Figure 5:
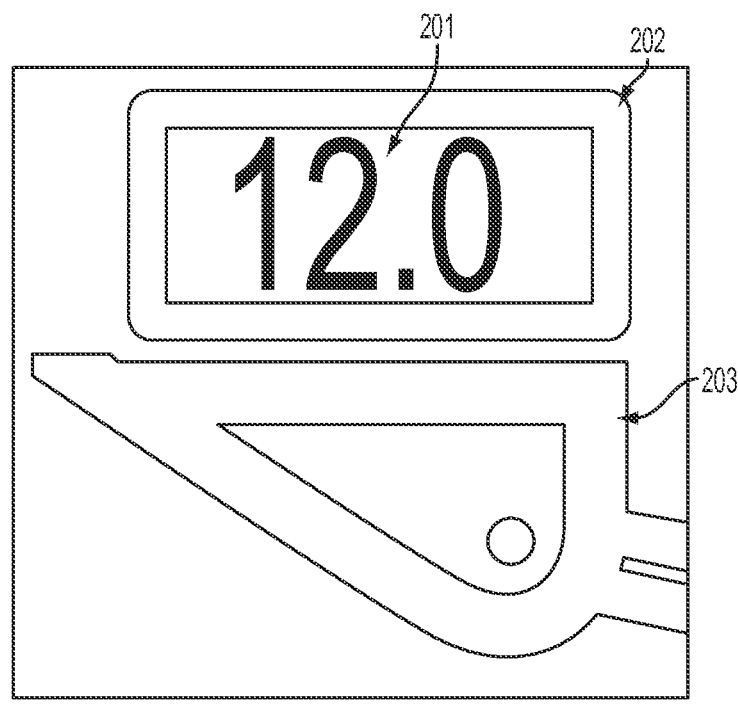
FIG. 5 depicts a portion of a display screen of an implement control system for a vehicle in accordance with an embodiment of the present disclosure.

Monitor 36 displays (120), at a first location, the implement payload weight. FIG. 4 depicts a display screen of an implement control system for a vehicle in accordance with an embodiment of the present disclosure, while FIG. 5 depicts a portion of a display screen of an implement control system for a vehicle in accordance with an embodiment of the present disclosure. As depicted in FIGS. 4 and 5, controller 34 sends a signal, directly or indirectly, to monitor 36 to display implement payload weight 201 as a number, i.e., "12.0", in an upper right portion of display screen 200.

Controller 34 then determines (130) an accuracy of the implement payload weight. In one embodiment, the accuracy of the calculation of the implement payload weight is based on the lift position. While implement payload weight is calculated at any lift position, controller 34 determines that the calculation is accurate if the lift position is within a predetermined lift range, i.e., the weigh range, as defined by the calibration and zero payload weight map data.

Monitor 36 displays (140), at a second location proximate to the first location, an indicator based on the implement payload weight accuracy. As depicted in FIGS. 4 and 5, controller 34 sends a signal, directly or indirectly, to monitor 36 to accuracy indicator 202 in an upper right portion of display screen 200. Generally, accuracy indicator 202 is a graphical user interface (GUI) element that is located in display screen 200 proximate to implement payload weight 301 to facilitate identification by the operator. Accuracy indicator 202 may be an icon, a widget, etc. In the depicted embodiment, accuracy indictor 202 is a green rectangle that surrounds implement payload weight 201. A graphical representation of implement 18 may also be provided on display screen 200, such as bucket icon 203.

Monitor 36 may be a touch screen device that presents GUI elements related to the implement control system 50, such as, for example, a zero button 204, a reweigh button 206, a material ID selection button 208, a truck target weight widget 210, which includes a display of the truck weight and an input button to enter the target truck payload weight, a truck ID selection button 212, a system standby button 214, a clear button 216, a pass count 220, a truck payload weight 222 and a truck ID 224. Other GUI elements may be provided around the edge of display screen 200, such as a printer status icon 218.

Aspects of the present disclosure advantageously display the implement payload weight to the operator of a vehicle throughout the entire range of motion of the implement, along with an indication of the accuracy of the calculation, which allows the operator to work more efficiently, thereby improving productivity, reducing fuel and maintenance costs, etc. Any vehicle having a payload-bearing work implement may benefit from the different aspects of this disclosure.

The many features and advantages of the disclosure are apparent from the detailed specification, and, thus, it is intended by the appended claims to cover all such features and advantages of the disclosure which fall within the true spirit and scope thereof. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for displaying an implement payload weight to an operator of a vehicle, comprising:
    calculating, by a processor, an implement payload weight at a lift position of an implement, the lift position being a raised position of the implement above a ground position of the implement in contact with the ground;
    displaying, at a first location on a monitor, the calculated implement payload weight;
    determining, by the processor, an accuracy of the calculated implement payload weight; and
    displaying, at a second location on the monitor proximate to the first location, an accuracy indicator based on the accuracy of the calculated implement payload weight.

2. The method of claim 1, wherein the calculated implement payload weight is displayed as a number and the accuracy indicator is displayed as an icon.

3. The method of claim 2, wherein the icon surrounds the number.

4. The method of claim 3, wherein the icon is green.

5. The method of claim 3, wherein the icon is a rectangle.

6. The method of claim 3, wherein the icon is a green rectangle.

7. The method of claim 1, wherein the accuracy indicator is displayed when the lift position of the implement is within a predetermined lift range.

8. The method of claim 7, wherein the predetermined lift range is between 10% and 90% of a maximum lift position.

9. The method of claim 7, wherein the lift position is measured by a rotation sensor and the maximum lift value is a fully-racked carry position.

10. The method of claim 7, wherein calculating the implement payload weight includes:
    determining a pressure difference between an implement lift cylinder head-end pressure and an implement lift cylinder rod-end pressure;
    determining a calibration payload pressure difference at the lift position based on data associated with a calibration payload weight;
    determining a zero payload pressure difference at the lift position based on data associated with a zero payload weight; and
    determining the implement payload weight based on the pressure difference, the calibration payload pressure difference, the zero payload pressure difference and the calibration payload weight.

11. The method of claim 10, wherein the implement is a bucket, and the calibration payload weight is a predetermined percentage of a maximum bucket payload weight.

12. The method of claim 11, wherein the predetermined percentage is about 95%.

13. The method of claim 7, wherein calculating the implement payload weight includes measuring a deflection of a linkage component supporting the implement using an optical sensor.

14. The method of claim 7, wherein calculating the implement payload weight includes measuring a strain of a linkage component supporting the implement using a strain gauge.

15. A system for displaying an implement payload weight to an operator of a vehicle, comprising:
 a monitor; and
 a controller, coupled to the monitor, including a processor adapted to:
  calculate an implement payload weight at a lift position of an implement, the lift position being a raised position of the implement above a ground position of the implement in contact with the ground,
  cause the calculated implement payload weight to be displayed on the monitor at a first location,
  determine an accuracy of the calculated implement payload weight, and
  cause an accuracy indicator to be displayed on the monitor, at a second location proximate to the first location, based on the accuracy of the calculated implement payload weight.

16. The system of claim 15, wherein the calculated implement payload weight is displayed as a number and the accuracy indicator is displayed as an icon.

17. The method of claim 16, wherein the icon is a green rectangle that surrounds the number.

18. The system of claim 15, wherein the accuracy indicator is displayed when the lift position of the implement is within a predetermined lift range.

19. The system of claim 15, further comprising a rotation sensor, an optical sensor or a strain gauge coupled to the controller.

20. A system for displaying an implement payload weight to an operator of a vehicle, comprising:
 means for calculating an implement payload weight at a lift position of an implement, the lift position being a raised position of the implement above a ground position of the implement in contact with the ground;
 means for determining an accuracy of the calculated implement payload weight; and
 means for displaying the calculated implement payload weight and an accuracy indicator proximate thereto, the accuracy indicator being based on the accuracy of the calculated implement payload weight.

* * * * *